Patented May 2, 1933

1,907,156

UNITED STATES PATENT OFFICE

LUDWIG ORTHNER AND EUGEN GLIETENBERG, OF LEVERKUSEN-ON-THE-RHINE, GERMANY, ASSIGNORS TO GENERAL ANILINE WORKS, INC., OF NEW YORK, N. Y., A CORPORATION OF DELAWARE

COLORED RUBBER COMPOSITION

No Drawing. Application filed March 27, 1931, Serial No. 525,868, and in Germany April 3, 1930.

The present invention relates to colored rubber goods.

In accordance with the invention colored rubber goods are obtained by incorporating within rubber aluminium lakes of hydroxy- or hydroxy-amino-anthraquinone-sulfonic acids containing at least two hydroxy groups or at least one hydroxy- and one amino- or alkylamino group in para-position to one another.

Said aluminium lakes can be prepared, for example, by dissolving the hydroxy-anthraquinone-sulfonic acid derivative in water and precipitating the aluminium lake by the addition of aluminium-hydroxide; or by dissolving the sulfonic acid, from which the lake is to be produced in water in the presence of aluminium sulfate and precipitating the lake by means of sodium carbonate.

The aluminium lakes thus obtainable can be used for rubber coloring purposes themselves or precipitated on an appropriate substratum, such as, aluminium oxide, blanc fixe, lithopone, titanium white etc. Likewise, the aluminium lakes may be brought into a pasty form, for example by means of vaseline or factis, before incorporating same within the rubber.

Under the term "rubber" we understand natural rubber varieties and artificial rubber-like masses, as are obtainable, for example, by polymerizing in any desired manner a butadiene hydrocarbon, such as butadiene-(1.3), isoprene or 2.3-dimethylbutadiene-(1.3) alone or in admixture with one another or with another polymerizable compound.

The incorporation of the aluminium lakes within the rubber may be performed in the usual manner, for example, by rolling or kneading. Likewise, the aluminium lakes may be added to natural or artificial rubber latices, whereafter coagulation of the latices may be effected in any desired manner.

The colored rubber goods thus obtainable may be vulcanized according to the customary methods, after the addition of the ingredients usually applied in vulcanization processes, such as, sulfur, compounding materials, vulcanization accelerators, antiperishing agents etc.

When using in the claims the term "rubber goods" it is intended to include as well the unvulcanized colored rubber as the vulcanization products derived from the latter.

The following example illustrates our invention, without, however, limiting it thereto:—

*Example.*—For the manufacture of colored qualities of vulcanized rubber, mixtures of the following composition are vulcanized for 15 minutes at 2 atmospheres pressure (super-atmospheric):

|  | Parts by weight |
|---|---|
| Crepe | 100 |
| Zinc oxide | 5 |
| Lithopone | 5 |
| Sulfur | 2.5 |
| Tetramethyl-thiuram-disulfide | 0.35 |
| Pigment | 2 |

When the aluminum lake of 1.4-dihydroxy-anthraquinone-6-sulfonic acid or of 1.4-dihydroxy-anthraquinone-2-sulfonic acid is used as the pigment, bluish-red colorations are obtained. The aluminium lake of 1.4-dihydroxy-anthraquinone-2.6-disulfonic acid yields a reddish-violet coloration; the aluminium lakes of 1.4-2-trihydroxy-anthraquinone-2.6-disulfonic acid or of 1.5-diamino-4.8-dihydroxy-anthraquinone-3.7-disulfonic acid or of 1.5-dimethylamino-4.8-dihydroxy-anthraquinone-3.7-disulfonic acid yield brilliant blue colorations. Likewise the aluminium lake of purpurine 3-sulfonic acid yields satisfactory results. By the use of the blue aluminium lakes in admixture with suitable yellow pigments, green colored rubber goods are obtained.

In a manner similar to that described in the above example, colored vulcanization products can likewise be obtained from synthetic rubber-like masses, such as result, for example, by the polymerization of butadiene or a homologue or analogue thereof.

It may be mentioned that the colored rubber goods obtainable with the use of the aluminium lakes described possess good fastness properties, especially to light and soap. Furthermore, the aluminium lakes in question have the valuable property of not bleeding, that is to say, of not coloring white rubber mixtures, with which they are simultaneously vulcanized.

We claim:—

1. Colored rubber goods comprising a complex aluminium lake of a compound of the group consisting of hydroxy-anthraquinone-sulfonic acids containing at least two hydroxy groups in para-position to each other, and amino - hydroxy - anthraquinone - sulfonic acids, which contain at least one amino group, a hydrogen atom of which may be substituted by an alkyl group, and one hydroxy group in para-position to each other.

2. Colored rubber goods comprising a complex aluminium lake of a compound of the formula

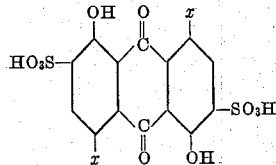

wherein the $x$'s mean amino or alkylamino groups.

3. Colored rubber goods comprising the complex aluminium lake of the compound

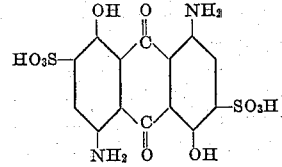

In testimony whereof, we affix our signatures.

LUDWIG ORTHNER.
EUGEN GLIETENBERG.